United States Patent [19]

Daitoku et al.

[11] 4,318,603
[45] Mar. 9, 1982

[54] FILM REWIND DEVICE IN A CAMERA

[75] Inventors: Koichi Daitoku, Tokyo; Hatsuo Sakamoto, Chiba; Nobuhiko Terui, Tokyo; Toshiaki Hozumi, Tokyo; Yoshio Sekine, Tokyo; Yukio Hyodo, Hiratsuka; Masanori Ichikawa, Tokyo; Masamichi Wada, Tokyo; Tsuyoshi Kudo, Tokyo; Manabu Nakamura, Kawasaki; Nobuaki Nakanishi, Kawasaki; Takeo Komai, Kawasaki; Yoshio Matsuzawa, Tokyo, all of Japan

[73] Assignee: Nippon Kogaku K.K., Tokyo, Japan

[21] Appl. No.: 134,771

[22] Filed: Mar. 28, 1980

[30] Foreign Application Priority Data

Jan. 21, 1979 [JP] Japan ............................ 54-52770[U]

[51] Int. Cl.³ .......................... G03B 1/00; G03B 1/04
[52] U.S. Cl. .................................... 354/214; 242/71.6
[58] Field of Search ...................... 354/214; 242/71.6

[56] References Cited

U.S. PATENT DOCUMENTS

| | | | |
|---|---|---|---|
| 3,679,148 | 7/1972 | Daitoku et al. | 242/71.6 |
| 3,735,683 | 5/1973 | Umeda | 242/71.6 |
| 4,149,793 | 4/1979 | Date | 354/214 |
| 4,222,651 | 9/1980 | Urano et al. | 354/214 |

Primary Examiner—Russell E. Adams
Attorney, Agent, or Firm—Fitzpatrick, Cella, Harper & Scinto

[57] ABSTRACT

A film rewind device in a camera in which a rewind coupling is automatically engaged with a cassette shaft in response to rewind operation has a rotatable member having a spiral groove on its peripheral wall portion and said rewind coupling at the end of the shaft thereof, the rotatable member being slidable in axial direction and rotatable by rewind operation, and a meshing member meshing with the spiral groove at the initial stage of the rewind operation to thereby slide the rotatable member in axial direction to cause the coupling to engage the cassette shaft. The mesh engagement between the meshing member and the spiral groove is released in axial direction when the coupling engages the cassette shaft, so that the meshing member comes to support the rotatable member so as to block the return of the rotatable member in axial direction.

7 Claims, 3 Drawing Figures

FILM REWIND DEVICE IN A CAMERA

BACKGROUND OF THE INVENTION

1. Field of the Invention

This invention relates to a film rewind device in a camera.

2. Description of the Prior Art

As a device of this kind, the device disclosed in Japanese Utility Mode Publication No. 23010/1977 is known. This device is such that a rewind coupling is automatically brought into a cassette chamber by rewind operation so as to engage the cassette shaft, whereafter the engagement between the rewind coupling and the cassette shaft is maintained to permit film rewind to be accomplished.

However, this conventional device has suffered from the disadvantages that means for causing the rewind coupling to automatically engage the cassette shaft by rewind operation and means for maintaining such engagement are complicated and difficult to manufacture and that the manufacturing cost thereof is high.

SUMMARY OF THE INVENTION

It is an object of the present invention to eliminate the above-noted disadvantages and to provide a film rewind device which is simple in construction.

The invention will become fully apparent from the following detailed description of an embodiment thereof taken in conjunction with the accompanying drawings.

DESCRIPTION OF THE PREFERRED EMBODIMENTS

Figure 1:
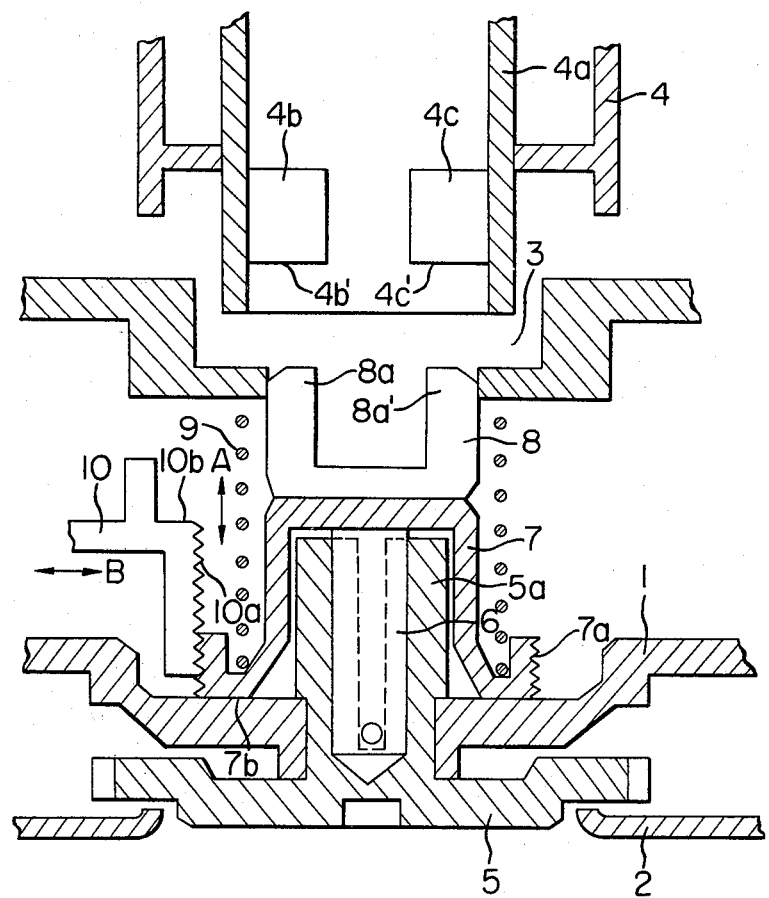
FIG. 1 is a cross-sectional view of an embodiment of the present invention illustrating essential parts during the film advance operation.
Figure 2:
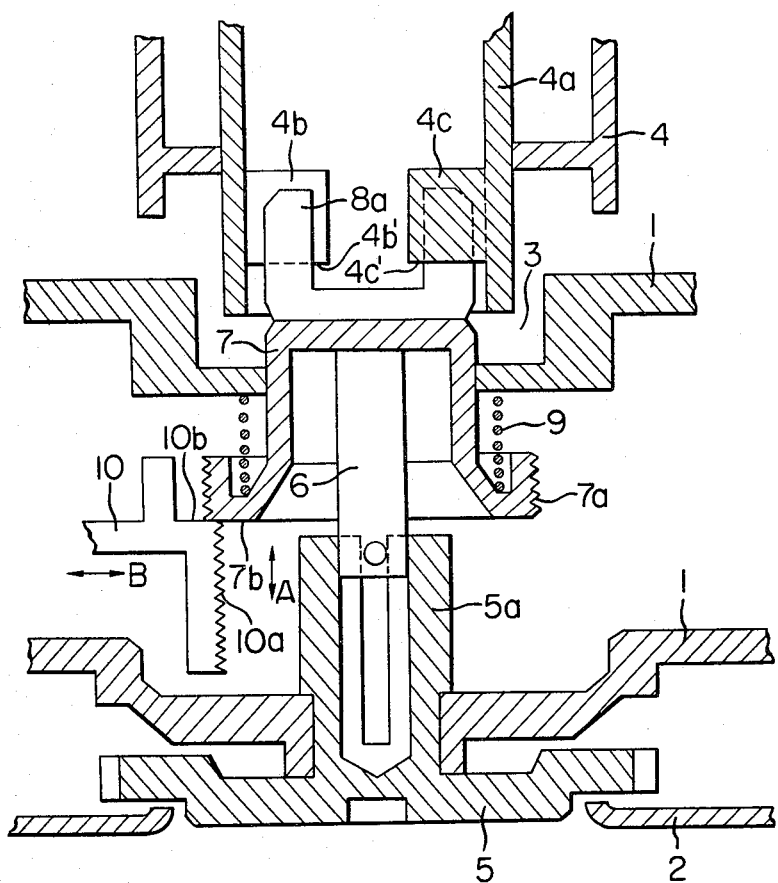
FIG. 2 is a cross-sectional view of the FIG. 1 embodiment illustrating essential parts at the completion of the film rewind.
Figure 3:
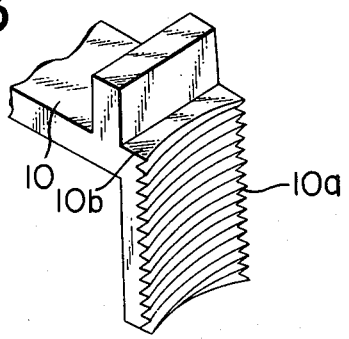
FIG. 3 is a perspective view of a meshing member in the FIG. 1 embodiment.

Referring to FIGS. 1 to 3 which show an embodiment of the present invention, reference numeral 1 designates a base plate in a camera body, reference numeral 2 denotes a bottom lid, and reference numeral 3 designates a cassette chamber for containing a film cassette 4. A gear 5 may be driven by a motor, not shown, when film rewind is effected. A sliding shaft 6 is slidable in the rotary shaft 5a of the gear 5 and rotatable with the rotary shaft 5a. A rotatable member 7 is provided integrally with the sliding shaft 6 and has a spiral groove 7a (in the present embodiment, an external thread) on the outer periphery thereof. A rewind coupling 8 is provided on the upper end of the rotatable member 7. A biasing member 9 biases the rotatable member in a direction in which the rewind coupling 8 is retracted from the cassette chamber 3. A meshing member 10 meshes with the spiral groove 7a of the rotatable member and has on its tip end a spiral projection 10a (in the present embodiment, an internal thread) meshing with the spiral groove 7a. This member 10 is limited in movement in axial direction A and is only movable in radial direction B. Also, the meshing member 10 is biased by an unshown member so as to mesh with the spiral groove 7a of the rotatable member. A perspective view of the meshing member 10 is shown in FIG. 3.

Operation will now be described. When film advance operation is effected from the state of FIG. 1 by an unshown motor contained in the camera body 1, film is drawn out of the cassette 4 and a cassette shaft 4a on which the film is wound is also rotated. However, the rewind coupling 8 is retracted from the cassette chamber 3 and therefore, it does not impede the film advance operation.

When photography of a prescribed number of frames has been terminated and the gear 5 is coupled to the motor in response to the rewind operation such as making a sprocket (not shown) free, the gear 5 starts to rotate from the state of FIG. 1. Consequently, the sliding shaft 6, the rotatable member 7 and the rewind coupling 8 are also rotated in the same direction.

On the other hand, at the initial stage of the rewind operation, the spiral projection 10a of the meshing member 10 is in mesh engagement with the spiral groove 7a of the rotatable member 7 and therefore, the rotatable member 7 slides in the axial direction A while being rotated and the rewind coupling 8 comes into the cassette chamber 3. At last, as shown in FIG. 2, the rewind coupling 8 comes into engagement with claws 4b and 4c in the cassette shaft 4a.

When the rewind coupling 8 thus comes into engagement with the cassette shaft 4a, the spiral groove 7a of the rotatable member 7 passes over the spiral projection 10a of meshing member and the mesh engagement therebetween is broken in the axial direction, so that the rewind coupling 8 does not come further into the cassette shaft. At the same time, the meshing member 10 comes below the rotatable member 7 with the aid of a biasing force and thus, the upper end 10b of the meshing member supports the underside 7b of the rotatable member against the biasing force of the biasing member 9, whereby the position of the rotatable member 7 in the axial direction A is maintained and the engagement between the rewind coupling 8 and the cassette shaft 4a is maintained.

The rotation of the unshown motor is transmitted to the cassette shaft 4a through the gear 5, the rotatable member 7 and the coupling 8 to draw the film into the cassette 4, thus effecting the film rewind.

Usually, the engagement between the rewind coupling 8 and the cassette shaft claws 4b and 4c is accomplished in this manner, but if the upper ends 8a and 8a' of the rewind coupling 8 bear against the lower end faces 4b' and 4c' of the claws 4b and 4c when the rewind coupling 8 comes into the cassette shaft 4a, there is a fear that the claws 4b and 4c may be damaged. In the present embodiment, the configurations of the spiral groove 7a and the spiral projection 10a are suitably determined so that, when the upper ends 8a and 8a' of the rewind coupling 8 bear against the lower end faces of the claws 4b and 4c, the meshing member 10 is forced out leftwardly as viewed in the drawing by the rotation of the rotatable member 7 against the biasing force. In the meantime, the upward movement of the rotatable member 7 and the rewind coupling 8 is stopped and the rotation thereof only takes place. When the upper ends 8a and 8a' of the rewind coupling 8 become disengaged from the lower end faces 4b' and 4c' of the claws 4b and 4c, the rotatable member 7 and the rewind coupling 8 are again moved upwardly by the mesh engagement between the spiral groove 7a and the spiral projection 10a, so that the rewind coupling 8 comes into the cassette shaft and, as shown in FIG. 2, the rewind coupling 8 comes into engagement with the claws 4b and 4c in the cassette shaft 4a. Thereafter, in the same manner as already described, the upper end 10b of the meshing member supports the underside 7b of the rotatable member, thus effecting the film rewind.

After completion of the film rewind, the meshing member 10 is retracted leftwardly as viewed in the drawing in response to the operation of opening a back lid (not shown) and the rotatable member 7 and the rewind coupling 8 are returned to their positions of FIG. 1 by the biasing force of the biasing member 9. If the back lid is closed, the meshing member 10 will also return to its position of FIG. 1.

Description has so far been made of an embodiment in which the meshing member 10 is moved in the radial direction B of the rotatable member 7 when the upper ends 8a and 8a' of the rewind coupling bear against the lower end faces 4b' and 4c' of the claws. However, the meshing member 10 may be provided so as to be more or less movable in the axial direction A and this member 10 may be upwardly biased by a relatively strong biasing force. In this case, as in the above-described embodiment, the upward movement of the rotatable member 7 and the rewind coupling 8 is accomplished by the rotation of the rotatable member 7, but when the upper ends 8a and 8a' of the coupling 8 bear against the lower end faces 4b' and 4c' of the claws, the two members 10 and 7 lower against said relatively strong biasing force with the spiral groove 7a and the spiral projection 10a remaining in mesh engagement with each other. When the upper ends 8a and 8a' of the coupling become disengaged from the lower end faces 4b' and 4c' of the claws, the meshing member is moved upwardly to its initial position by that biasing force and the coupling 8 comes into engagement with the cassette shaft claws 4b and 4c.

Besides such a method, the rewind coupling 8 may be provided so as to be rotatable with the rotatable member 7 and moreover to slide in the axial direction A with respect to the rotatable member 7, and a biasing member (not shown) may be provided between the rewind coupling 8 and the rotatable member 7 to always bias the rewind coupling 8 upwardly. It this is done, when the upper ends 8a and 8a' of the coupling bear against the lower end faces 4b' and 4c' of the claws, the rotatable member does not lower but only the rewind coupling 8 is depressed against the biasing force. When the upper ends 8a and 8a' of the coupling are disengaged from the lower end faces 4b' and 4c' of the claws, the coupling 8 becomes engaged with the claws 4b and 4c.

In the above-described embodiments, description has been made with respect to a case where the meshing member has a spiral projection. However, the same effect as described above can be obtained even in a case where the meshing member has a pin engageable with the spiral groove of the rotatable member.

Also, in the previous embodiment, it has been described that the meshing member 10 is retracted from the rotatable member 7 in response to the operation of opening the back lid, whereas the meshing member 10 may be retracted from the rotatable member 7 when an operating member for opening the back lid is operated, or the meshing member 10 may be operatively associated with the back lid itself so that when the back lid is opened, the meshing member 10 may be retracted from the rotatable member. In this specification, the words "operation of opening the back lid" are intended to include the above-described two cases.

Accordingly to the present invention, as has been described above in detail, during the rewind operation, engagement between the rewind coupling and the cassette shaft can be accomplished by the mesh engagement between the meshing member and the rotatable member and, when the engagement between the two is accomplished, said meshing engagement is released and the engaged state of the rewind coupling is maintained by the meshing member itself. Accordingly, there can be provided a rewind device which is simple in construction and easy and inexpensive to manufacture.

We claim:

1. A film rewind device in a camera in which a rewind coupling is automatically engaged with a cassette shaft in response to rewind operation, said device having a rotatable member having a spiral groove on its peripheral wall portion and said rewind coupling at the end of the shaft thereof, said rotatable member being slidable in axial direction and rotatable by the rewind operation, and a meshing member meshing with said spiral groove at the initial stage of the rewind operation to thereby slide said rotatable member in axial direction to cause said coupling to engage said cassette shaft, said meshing member being movable radially of said rotatable member and retractable from said spiral groove by said movement, the mesh engagement between said meshing member and said spiral groove being released in axial direction when said coupling engages said cassette shaft, so that said meshing member comes to support said rotatable member so as to block the return of said rotatable member in axial direction.

2. The device according to claim 1, wherein said meshing member is moved radially of said rotatable member in response to the operation of opening a back lid and is retracted from said spiral groove.

3. The device according to claim 1, wherein said meshing member is biased in a direction to engage said spiral groove.

4. The device according to claim 1, wherein said rotatable member is biased in axial direction so that said rewind coupling is retracted from said cassette shaft.

5. The device according to claim 1, wherein said meshing member has a projection engageable with said spiral groove.

6. The device according to claim 1, wherein said meshing member has a spiral projection engageable with said spiral groove.

7. The device according to claim 6, wherein the spiral groove provided on said rotatable member is formed by an external thread, and the spiral projection of said meshing member is formed by an internal thread.

* * * * *

UNITED STATES PATENT AND TRADEMARK OFFICE
CERTIFICATE OF CORRECTION

PATENT NO. : 4,318,603

DATED : March 9, 1982

INVENTOR(S) : Koichi Daitoku, et al.

It is certified that error appears in the above—identified patent and that said Letters Patent is hereby corrected as shown below:

On the title page, item (30), "Jan." should read -- April --.

Column 3, line 43, "It" should read -- If --.

Signed and Sealed this

Twenty-second Day of June 1982

[SEAL]

Attest:

Attesting Officer

GERALD J. MOSSINGHOFF

Commissioner of Patents and Trademarks